United States Patent [19]

Drechsel

[11] 4,086,322

[45] Apr. 25, 1978

[54] PRODUCTION OF FLUORIDE-FREE PHOSPHATES

[75] Inventor: Erhart K. Drechsel, Houston, Tex.

[73] Assignee: Pennzoil Company, Shreveport, La.

[21] Appl. No.: 608,973

[22] Filed: Aug. 29, 1975

Related U.S. Application Data

[63] Continuation-in-part of Ser. No. 512,877, Oct. 7, 1974, abandoned.

[51] Int. Cl.² .............................................. C01B 25/16
[52] U.S. Cl. ................................... 423/158; 423/166; 423/167; 423/309; 423/319; 423/323
[58] Field of Search .............. 423/167, 320, 319, 185, 423/308, 332, 324, 462, 166, 309, 323, 158; 71/41

[56] References Cited

U.S. PATENT DOCUMENTS

| | | | |
|---|---|---|---|
| 3,512,927 | 5/1970 | Betts | 423/320 |
| 3,554,694 | 1/1971 | Barker et al. | 423/320 |
| 3,792,151 | 2/1974 | Case | 423/320 |
| 3,795,728 | 3/1974 | Scheel | 423/166 |
| 3,840,640 | 10/1974 | Drechsel | 423/167 |

FOREIGN PATENT DOCUMENTS

| | | | |
|---|---|---|---|
| 1,237,074 | 3/1967 | Germany | 423/320 |
| 1,173,205 | 12/1969 | United Kingdom. | |

OTHER PUBLICATIONS

Chemical Abstracts, vol. 77, p. 106, 1972, Item 141900V.

Primary Examiner—O. R. Vertiz
Assistant Examiner—Wayne A. Langel
Attorney, Agent, or Firm—Lowe, King, Price & Markva

[57] ABSTRACT

A method is disclosed for the acidulation of phosphate rock and the production of substantially pure alkali metal phosphates, calcium phosphates, and phosphoric acid which are essentially free of fluorides and recovery of the fluorine values from the starting phosphate rock in useful form. The steps of the method comprise initial acidulation of phosphate rock with a phosphoric acid solution containing sufficient alkali metal values to provide $R_2O$ in the system, where R is alkali metal, to solubilize the phosphates and form an insoluble precipitate comprising a mixture of impurities, sand ($SiO_2$) and the fluorides, from which the fluorides can be recovered in usable form. In preferred embodiments, after removal of the precipitate containing the fluorides, a portion of the solution of phosphoric acid and calcium phosphate is reacted with sulfuric acid and $RHSO_4$ or $R_2SO_4$ where R is alkali metal, to form a solution of $RH_2PO_4$ and phosphoric acid and at least a portion of the $RH_2PO_4$ and phosphoric acid solution is recycled to the initial acidulation to provide the $R_2O$ and phosphoric acid makeup. The remainder of the solution of calcium phosphate and phosphoric acid may be further processed for recovery of useful products such as monocalcium phosphate and/or dicalcium phosphate, phosphoric acid, alkali metal phosphates, and calcium sulfate.

12 Claims, 2 Drawing Figures

PRODUCTION OF FLUORIDE-FREE PHOSPHATES

CROSS REFERENCE TO RELATED APPLICATION

This is a continuation-in-part of application Ser. No. 512,877, filed Oct. 7, 1974, entitled "Production of Fluoride-Free Phosphates", and now abandoned.

BACKGROUND OF THE INVENTION

1. Field of the Invention

This invention relates to a method for the production of alkali metal phosphates and phosphoric acid by the acidulation of phosphate rock and more particularly to a method for the acidulation of phosphate rock in the substantial absence of fluorine evolution, recovery of the fluorides as useful solid values, and recovery of fluoride-free products.

2. Description of the Prior Art

Phosphoric acid plants are currently operated utilizing a basic and well known process for the acidulation of phosphate rock which comprises reaction of the rock with sulfuric acid to form phosphoric acid with subsequent reaction of the phosphoric acid, with for example ammonia to produce monoammonium phosphate (MAP) and diammonium phosphate (DAP). The phosphoric acid formed in this process is called wet process phosphoric acid. In this reaction, a by-product is gypsum having the chemical formula $CaSO_4 \cdot 2H_2O$. Essentially all phosphate rock contains some fluorine, normally in the 3.0 to 4.0% range, and the acidulation reaction usually generates gaseous fluorides.

In recent years, both air and water pollution laws and regulations have become more stringent and are now being enforced more rigorously. Operating companies have had many pollution problems with fluorine emission into the atmosphere and with the by-product gypsum from these phosphoric acid plants. Thus, an important problem in the operation of these wet process phosphoric acid plants has been in the expensive methods for handling the large amounts of fluorine compounds which are liberated in the gaseous and aqueous effluents from such plants. In some phosphate complexes from 10,000 to 30,000 tons per year of fluorine compounds may be liberated by various methods. It is estimated that in a typical wet process phosphoric acid plant, a portion of the fluorides are evolved into the atmosphere in gaseous form, such as hydrogen fluoride and silicon tetrafluoride, which can destroy vegetation and affect other facilities in close proximity to the plant if they are not scrubbed out and such scrubbing systems are not always effective. A second portion of the fluorine is found in the gypsum dumps and is subject to leaching into groundwater and streams. Still another portion of the fluorine remains with the final products and when such products are used as when adding fertilizers to the soil, they change the soluble and insoluble fluoride levels. It is only in recent years that studies have been made on the effects of fluorides contained in the final product and indications seem clear that they may have a deleterious effect on the long range producing ability of the soil. See for example Kudzin et al, Chem. Ab., 73, 870534 (1970).

In these systems, any conventional wet process phosphoric acid technology accomplishes two primary objectives, namely: (1) phosphate rock acidulation, and (2) the growth of readily filterable calcium sulfate crystals either as the dihydrate (gypsum), or as the hemihydrate. Conventional phosphoric acid technology carries out both of these objectives essentially simultaneously which leads to a number of environmental and purification problems almost immediately. The presence of strong sulfuric acid in the acidulation phase releases fluorides as HF, $SiF_4$, and/or $H_2SiF_6$. This poses serious fluoride containment and subsequent recovery problems. Furthermore, unless excess sulfate levels are carefully and closely controlled, minute gypsum crystals can and will blind rock particles and usually result in poor $P_2O_5$ recovery. The presence of free $H_2SiF_6$ in the acid system leads to severe scaling and excessive maintenance costs even with improved design features to minimize this effect.

There is a great deal of literature and patent art related to attempts to remove the fluoride values from fluorine-containing phosphate rock in the operation of a phosphoric acid plant including methods for suppressing the evolution of fluoride values in the operation of a process and/or attempting to scrub the fluorine from effluent gases and waste water. Two such methods are described in U.S. Pat. Nos. 2,954,275 and 2,976,141 to Carothers et al which use sodium or potassium compounds of suppress the fluorides so that they are concentrated in the gypsum cake. These patents indicate that this is achieved by adding a suppressing amount of an alkali metal salt to the acidulation reaction. However, these processes were conducted in the presence of sulfuric acid in the acidulation reactor and the process had incomplete control on fluoride decomposition and evolution during acidulation.

Other prior art patents have been noted which have also attempted to overcome the problem of fluorine evolution and the reduction of the amount of fluorine contained in final products. A reference of this type is British Pat. No. 735,086 (1955), which discloses the acidulation of phosphate rock by a two step procedure using a strong mineral acid such as nitric acid or hydrochloric acid. According to this patent, an initial low temperature acidulation at 20°–50° C. is carried out with the addition of an alkali, for example, ammonia or lime, as a precipitating agent in a quantity sufficient to precipitate substantially the whole of the fluorine and other impurities but insufficient to precipitate a substantial amount of calcium phosphates. After precipitation and optional removal of this precipitate, indicated as being calcium fluoride by the patentee, the mixture is heated to 75° C. and the acidulation completed by adding a further quantity of alkaline precipitating agent. This patent, however, does not suggest that the use of the strong mineral acid in even the low temperature procedure is going to necessarily provide sufficient reaction to result in at least some fluorine evolution. Moreover, it is doubtful that the precipitate recovered will be in the form of a calcium fluoride. Therefore, while this patentee appreciated the concept of attempting to remove the fluorides prior to the completion of the acidulation reaction, it is clear from a reading of this patent that he did not accomplish the intended purpose.

In a similar process, in U.S. Pat. No. 3,431,096 to Hill et al a process is disclosed for reducing evolution of fluorine values in formation of triple superphosphate fertilizer by reaction of phosphate rock and phosphoric acid wherein ammonia or urea is added to suppress the fluorine evolution. However, in this patent, there is no provision for removal of the fluorine values from the product and therefore even if the fluorine evolution is prevented, the fluorine values will be retained in the resulting product and therefore distributed to the soil when it is used as a fertilizer.

In a series of patents issuing from the mid 1940's to early 1960's there are disclosed processes for the defluorination of phosphate rock and the production of defluorinated calcium phosphates. In these U.S. Pat. Nos. 2,337,498; 2,442,969; 2,893,834; and 2,997,367, the defluorination reaction is carried out by subjecting a mixture of phosphate rock, phosphoric acid and an alkali metal material to calcination, that is by reaction at temperatures as high as 1000° to 2200° C. Obviously, under these conditions the fluorine is going to be rapidly evolved or if not evolved certainly will remain in the final product, said to be an animal feed. Therefore, these patents did not provide a solution to the problem of fluorine evolution and of fluorine remaining in the final product.

Two additional patents of pertinence to processes of this type are U.S. Pat. Nos. 2,567,227 and 2,728,635 to Miller which disclose the acidulation of phosphate rock with phosphoric acid to form monocalcium phosphate, cooling to solidify the monocalcium phosphate and then converting it to dicalcium phosphate by hydrolysis. In the earlier patent, it is indicated that the fluorine in the rock is vaporized in the system, circulates throughout the system and/or leaves the system with the calcium phosphate. The later patent indicates that the process of U.S. Pat. No. 2,567,227 provided a final calcium phosphate product having a fluorine content too high to be of animal feed grade. The solution to this problem in the later patent was the addition of some dilute sulfuric acid in the acidulation step which would of course lead to additional fluorine evolution during the first step.

There are also patents known in the art which indicate that it is known to acidulate phosphate rock with phosphoric acid and to then recover solid monocalcium phosphate by cooling of the resulting solution and recovering the monocalcium phosphate. Processes of this type are disclosed for example in U.S. Pat. Nos. 3,494,735 and 3,645,676. In addition, U.S. Pat. Nos. 3,619,136 and 3,792,151 to Case disclose the reaction of phosphate rock with recycle phosphoric acid at temperatures of about 125°–180° F. (52° to 83° C.) to form a solution of monocalcium phosphate, reacting the latter solution with sulfuric acid to produce phosphoric acid and calcium sulfate, precipitating the calcium sulfate, and recycling a portion of the phosphoric acid to the phosphate rock reaction. These patents point out that under the conditions recited, fluorides are not evolved but remain primarily unreacted and may be found with insoluble materials although a portion remains in the phosphoric acid solution product. Thus the products are going to be contaminated with fluorides. It is also known to react phosphate rock or a solubilized form with sulfuric acid and KHSO$_4$ in combination with other steps and this reaction is described in U.S. Pat. Nos. 3,697,246 and 3,718,253. None of these patents disclose the unique combination of steps and advantages achieved by the process of this invention.

Other patents in the phosphoric acid and fluoride art suggest methods for use of scrubbing and recycling plants in an effort to contain or convert the fluorides evolved so that as much as possible of the fluorine can be recovered. Nevertheless, in all of these earlier approaches to the problem, provisions are never made for disposing of the approximately one-tenth or more of fluoride contained in the final product nor are there provisions made for converting the fluorides to useful products.

German Offenlegungschrift 2,257,948 discloses the reaction of K$_2$SiF$_6$ with KOH and lime to ultimately form calcium fluoride. However, the K$_2$SiF$_6$ is not obtained from the acidulation of phosphate rock.

It is to be appreciated therefore, that the process of the invention provides an improvement over the processes of the references discussed herein and all other references of which applicant is aware. The present invention provides a system which substantially eliminates the problem of the fluorine evolution in the acidulation of fluorine-containing phosphate rock with phosphoric acid, the recovery of useful products from the acidulation reaction and the recovery of the fluorine contained in the rock in a usable form. Therefore, the present invention provides a unique combination of steps and advantages not appreciated heretofore in the prior art as none of these prior references disclose the unique combination of steps and results of this invention.

SUMMARY OF THE INVENTION

It is accordingly one object of this invention to produce relatively pure phosphoric acid and relatively pure alkali metal phosphates which are essentially free of fluorides, iron, aluminum, magnesium and other impurities.

A further object of the invention is to provide a multi-step procedure for the production of substantially pure alkali metal phosphates from phosphate rock in such manner as to essentially eliminate fluorine evolution and thus pollution and provide effective recovery of the fluorides in solid form from the reaction.

A still further object of this invention is to produce relatively pure potassium phosphates and pure phosphoric acid from phosphate rock in such manner as to eliminate or greatly reduce K$_2$O losses and yet recover the fluorides in usable form.

A still further object of this invention is to provide a multi-step process for the treatment of phosphate rock in such manner as to concentrate insoluble fluoride compounds in recoverable form so that they can be processed for fluorine and K$_2$O recovery and minimize contamination of the environment and final products by the presence of fluorine compounds.

A still further object of the invention is to provide a method for the acidulation of phosphate rock with phosphoric acid in the presence of K$_2$O which serves to precipitate the fluorides and impurities in the rock in recoverable form.

Other objects and advantages of the present invention will become apparent as the description thereof proceeds.

In satisfaction of the foregoing objects and advantages there is provided by this invention a method for the acidulation of phosphate rock and the production of substantially pure calcium phosphates, alkali metal phosphates and phosphoric acid which are essentially free of fluorides, iron and aluminum impurities and wherein the fluorine values in the starting phosphate rock can be recovered in useful form. The steps of the method comprise acidulation of phosphate rock with a phosphoric acid solution containing alkali metal values as R$_2$O, where R is alkali metal, in sufficient amounts to solubilize the phosphates and form an insoluble filterable precipitate comprising a mixture of impurities, sand (SiO$_2$) and the fluorides as R$_2$SiF$_6$ where R is alkali metal, from which the fluorides can be recovered in usable form; removing the precipitate, and recovering from the acidulation reaction a solution of calcium phosphate in phosphoric acid. In a preferred embodiment, at least a portion of the solution of phosphoric acid and dissolved calcium phosphate is reacted with sulfuric acid and $RHSO_4$ or $R_2SO_4$ where R is alkali metal, to form a solution of $RH_2PO_4$ and phosphoric acid, and recycling at least a portion of the $RH_2PO_4$ solution to the initial acidulation to provide the $K_2O$ values and phosphoric acid. Also provided are methods for recovery of useful products such as monocalcium phosphate, dicalcium phosphate, phosphoric acid, alkali metal phosphates, calcium sulfate and fluoride values. In alternative embodiments, the solution of calcium phosphates and phosphoric acid recovered from the acidulation reaction can be processed to recover calcium phosphates and phosphoric acid, or the solution can be reacted with a salt of the formula $RHSO_4$ or $R_2SO_4$, where R is alkali metal, to form an alkali metal dihydrogen phosphate, or an alkali metal dihydrogen phosphate and phosphoric acid and calcium sulfate; or with sulfuric acid to form phosphoric acid and calcium sulfate. Additional procedures are provided for recovery of alkali metal dihydrogen phosphate and phosphoric acid products and $CaSO_4$; for dehydrating the alkali metal dihydrogen phosphates to form alkali metal polyphosphates; for recovery of radioactive uranium values from the phosphoric acid/phosphate solutions; and for the formation of elemental phosphorus from the calcium phosphates. Also provided are continuous procedures for conducting these reactions.

BRIEF DESCRIPTION OF THE DRAWING

Reference is now made to the drawing accompanying this application wherein.

DESCRIPTION OF PREFERRED EMBODIMENTS

Figure 1:
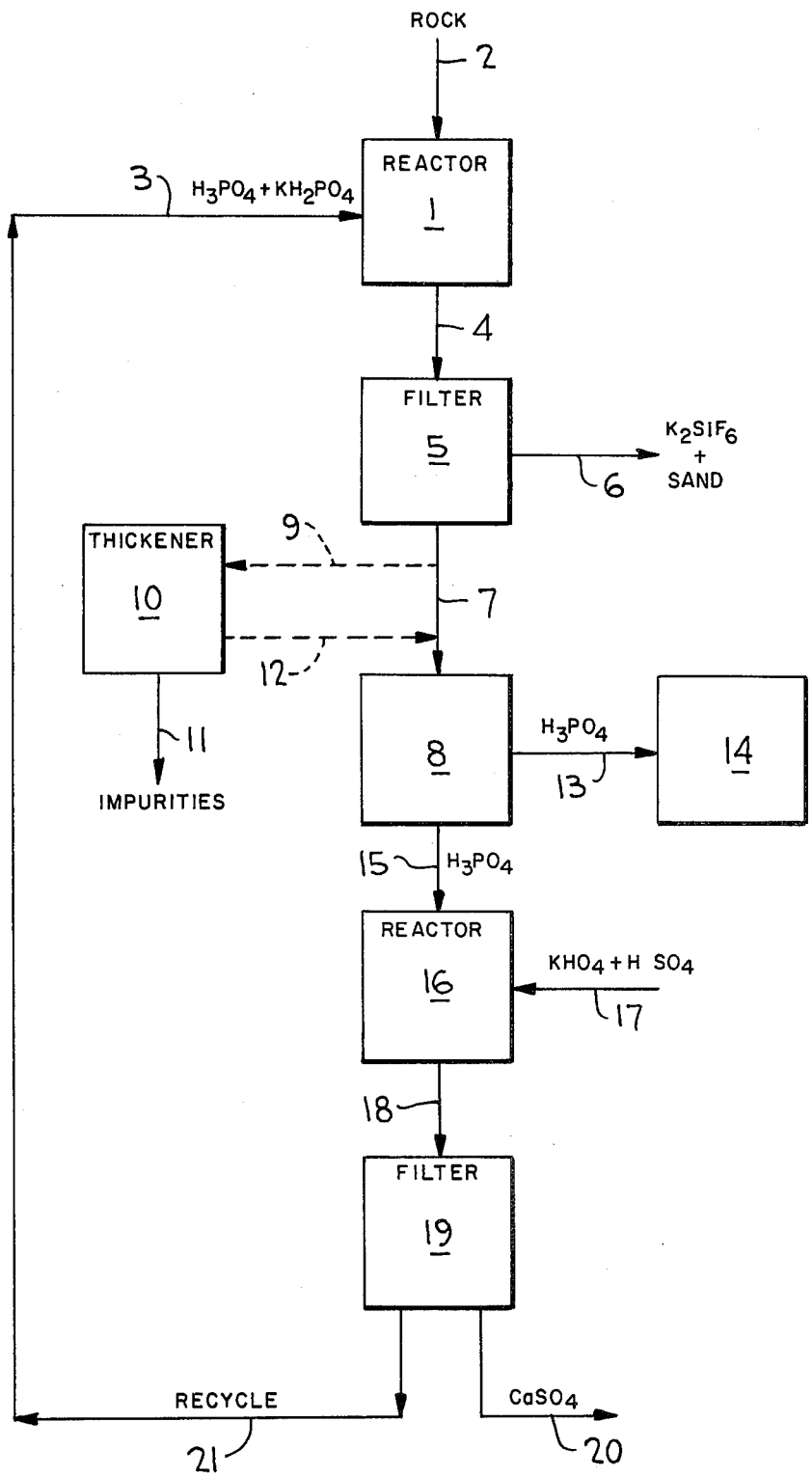
FIG. 1 shows a diagrammatic flow sheet for the general process of this invention.

As indicated above, this invention is concerned with a multi-step procedure for the preparation of essentially fluoride-free products, preferably alkali metal phosphates and phosphoric acid, by the acidulation of phosphate rock, which procedure is conducted in the substantial absence of fluorine pollution and wherein the fluorides may be recovered in usable form.

As is known, most of the commercially important phosphates ores mined in this country and particularly those mined in Florida, contain 3–4% fluorine after beneficiation. The fluorine is a constituent of fluoapatite which is commonly expressed as $Ca_9(PO_4)_6 \cdot CaF_2$ and may also be present as calcium fluosilicate ($CaSiF_6$). Silica is a component of phosphate rock and is usually abundant in most grades of rock that are commonly used in the production of wet process phosphoric acid. In usual processes the fluorine compounds in the phosphate rock react with sulfuric acid during the attack on the rock so that the fluorine appears in vapor form as hydrofluoric acid (HF), silicon tetrafluoride ($SiF_4$), or other gas, and in the phosphoric acid solution as fluosilicic acid ($H_2SiF_6$) and/or fluosilicate salts or other forms. Acids from a rock low in silicon may also contain free hydrogen fluoride. As pointed out above, phosphoric acid plants have been an aggravating source of air and water pollution and, probably more importantly, the fluorides have turned up as pollutants in the final product fertilizers or other commercial products from these plants. The present invention is considered to provide a significant solution to problems of fluoride pollution by providing a procedure for minimizing fluoride evolution while recovering substantially all of the fluorides in the solid form and thereby preventing the fluorides from contaminating the environment and desired products. The present invention also provides a series of substantially purer and useful products as well as novel procedures for obtaining these products without fluoride pollution.

As pointed out above, in one aspect, the process of this invention is concerned with the preparation of alkali metal phosphates and phosphoric acid and in a main embodiment of the invention, the alkali metal phosphate is an alkali metal dihydrogen phosphate. A preferred product is $KH_2PO_4$ which contains high plant food nutrients, and is highly valued as a fertilizer. $NaH_2PO_4$, an alternative product, is widely used in the detergent industry and other areas. The process of the present invention is carried out in a continuous manner in the optimum embodiment.

In the initial step of the process of this invention, phosphate rock, from any origin, but usually of the type described above containing at least some fluorides, is acidulated with a solution of phosphoric acid containing $R_2O$ values, where R is alkali metal, from room temperature up to about 105° C., and preferably about 70° to 95° C., for a time sufficient to achieve substantially complete acidulation, usually about ½ to 3 hours depending on the reaction temperature and using a sufficient solution of the phosphoric acid to completely solubilize the calcium phosphate formed. In this step, there must also be employed sufficient $R_2O$ values in the phosphoric acid solution to cause precipitation of the fluorides as a dense filterable precipitate, primarily as $R_2SiF_6$ together with $SiO_2$ and Al and Fe impurities. In the preferred embodiment, the $R_2O$ values are provided by $RH_2PO_4$ salts contained in a recycle phosphoric acid solution. $KH_2PO_4$ is especially preferred; however other inputs of $R_2O$ where R is alkali metal may also be used such as KOH, $K_2CO_3$, potassium formate (HCOOK), potassium acetate ($CH_3COOK$), etc. In general, $R_2O$ values may be defined as any potassium or sodium material which ionizes in the systems of this invention and will cause precipitation of the fluorides as taught herein.

In conducting this initial step, the amount of phosphoric acid solution which contains the $R_2O$ values, preferably $KH_2PO_4$, is utilized in sufficient excess to effect substantially complete acidulation and solubilization of the calcium in phosphate rock. The $P_2O_5$ content of the phosphoric acid should range from about 20–55% and preferably about 25–40% by weight. In general, there should be used an excess of phosphoric acid and preferably about 35 to 90 moles of phosphoric acid for each 6 moles of phosphate in phosphate rock, or a molar ratio of $P_2O_5$ in the acid to $P_2O_5$ in the rock, of about 6:1 to 15:1, respectively. Also, about 1.0 to 10 moles of $R_2O$, preferably more than about one mole, to provide a slight excess of $R_2O$, should be present for each three moles of phosphate rock of the formula $Ca_9(PO_4)_6 \cdot CaF_2$. In the main embodiment of this invention, the recycle stream recovered as an end product from the reaction is utilized to acidulate the rock as described hereinafter and will contain these preferred ratios of reactants. Thus, the present invention lends itself primarily to carrying out the process of this invention in a continuous manner.

As pointed out, the phosphoric acid is present in sufficient amounts to solubilize the calcium phosphate contained in the phosphate rock. Further, the $R_2O$ values such as the $RH_2PO_4$ salt are contained in the phosphoric acid in a sufficient amount to precipitate the fluorides present as dense crystalline solids which may be recovered readily. Thus, during the acidulation step, while the calcium phosphates are solubilized, there is precipitated a mixture of solids from which the fluorides may be recovered. This precipitate comprises sand or $SiO_2$, the fluorides essentially as $R_2SiF_6$ and impurities such as iron and aluminum phosphates. Since the precipitate is present as a dense crystalline solid, it can be removed by filtration or decantation from the mother liquor solution of calcium phosphate in phosphoric acid. It will thus be appreciated that during this step as carried out under the relatively mild conditions, the fluorides are essentially insolubilized as $R_2SiF_6$, the impurities are not peptized to form colloidal suspensions and there is little if any scaling due to the presence of free $H_2SiF_6$ in the solution. The resulting solid precipitate may be separated by decantation, by use of a thickener, a filter, a centrifuge or a hydroclone.

It is to be appreciated that the use of phosphoric acid as the treating acid to acidulate the phosphate rock represents an important embodiment of the invention. In this regard, phosphoric acid used is to be distinguished from the stronger mineral acids such as sulfuric acid, nitric acid, hydrochloric acid, and the like. As is shown in many standard reference books, phosphoric acid has a weaker ionization constant than mineral acids of the type mentioned. Therefore, because of the weaker nature of the phosphoric acid, under the reaction conditions stated for carrying out the acidulation reaction and in the presence of the alkali metal ion, there will not be a problem with respect to the evolution of fluoride materials from the rock as the acidulation reaction continues. This distinguishes the use of the phosphoric acid from stronger acids such as sulfuric acid, nitric acid and hydrochloric acid as those acids under many conditions will cause the evolution of at least some fluoride during the acidulation reaction. By use of the term phosphoric acid, it is meant that it is an acid that is ionized at less than 90% at a strength or concentration of 0.1 Normal. By this criteria, phosphoric acid is considered to be a moderately strong rather than a strong acid. Under the same definition, sulfuric acid, nitric acid and hydrochloric acid are ionized at 0.1 Normal concentrations at 90%, 92%, 93%, respectively, and are considered to be strong acids. Another criteria of defining acidic strength is by ionization constant. Thus the phosphoric acid and any equivalent acid employed in the reaction of this invention will have an ionization constant of no more than $7.5 \times 10^{-3}$.

While not wishing to be bound by any theory as to the mechanism of the process, it is believed that during the acidulation reaction, the presence of excess $R_2O$ where R is alkali metal, in the recycle stream drives the equilibrium of the reaction toward the production of the $R_2SiF_6$ product which will precipitate as a crystalline solid which can be easily removed. This is in contrast to other precipitated products which are colloidal and difficult to separate and the normal wet process acidulation which generally evolves a portion of the fluorides in gaseous form. The precipitated product of this invention has a distinctive crystalline structure, which characteristic, when coupled with its high density, permits segregation of fluorides along with sand or $SiO_2$ in the precipitate almost exclusively. Thus this is an essential and especially novel aspect of this invention.

The resulting precipitate containing the $SiO_2$ and $R_2SiF_6$ mixture can be further processed as desired to recover the valuable fluoride components contained therein. Thus, in one alternative the mixture may be reacted with alkali metal hydroxide to form alkali metal fluorides, $SiO_2$ and water from which valuable calcium fluorides may be recovered by reaction with calcium hydroxide. If desired, the calcium fluoride may be reacted further with sulfuric acid to produce gypsum and hydrogen fluoride. These recovery steps may be demonstrated by the following equations:

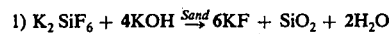

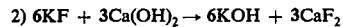

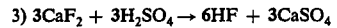

After the acidulation reaction is completed, the insoluble fluoride/sand precipitants are removed from the system as described to provide a resulting solution of calcium phosphate, usually monocalcium phosphate, in phosphoric acid. Even after removal of the precipitated fluorides, this solution may contain minor quantities of colloidal impurities in suspension, and for preferred applications, these impurities may be removed by conventional methods of thickening and separating to provide final products of high purity. Obviously where products of lower purity are satisfactory, this separation step may be omitted.

In a highly preferred embodiment of the present invention the initial acidulation reaction is conducted at a temperature of about 90° to 100° C. until acidulation is generally complete and any undissolved material contained in the mixture at that stage is separated at about the same temperature, e.g. about 95° C. At this temperature the insolubles comprise primarily sand, slime and other materials of this type but not necessarily the alkali metal fluosilicate.

The resulting clear solution is then cooled rapidly by about 40°-50° C. to obtain a crystalline precipitate of the alkali metal fluosilicate and the latter product is separated by thickening and/or filtration. The resulting alkali metal fluosilicate solid is relatively pure and is suitable for processing for recovery of calcium fluoride or other products as discussed above. The solution obtained from this separation is a solution of monocalcium phosphate in phosphoric acid and may be treated as described herein. This embodiment thus provides a procedure for effecting a preliminary separation of the slimes and alkali metal fluosilicates so that the latter is obtained in relatively pure form.

After these solid products are removed the resulting solution may be processed as desired to recover valuable products contained therein. Thus the solution may be cooled or water evaporated therefrom to cause precipitation of solid monocalcium phosphate and this solid is separated from the phosphoric acid. Alternatively, under the proper set of conditions, the solution may be heated to precipitate dicalcium phosphate in accordance with the phase diagram as published by Van Wazer (Phosphorus And Its Compounds, Vol. 1, 1958). In the preferred aspect, however, this solution is divided into two portions with one portion being used to provide the recycle stream for the acidulation step and the second portion to provide for the recovery of other products. Based on the amount of rock and recycle stream being reacted, a sufficient amount of the stream, i.e., the second portion, should be withdrawn to remove three moles of $P_2O_5$ from the system in order to maintain the proper amount of recycle $H_3PO_4$ and $RH_2PO_4$ in the system.

In this process, the portion of the clear solution to be recycled is removed and will preferably contain about 60 moles of monocalcium phosphate and about 340 moles $H_3PO_4$. This solution is reacted with a mixture of sulfuric acid and alkali metal sulfate ($RHSO_4$, $R_2SO_4$ or mixture) in stoichiometric proportions (preferably about 5 moles $KHSO_4$ and 55 moles $H_2SO_4$ or 2.5 moles $K_2SO_4$ and 57.5 moles $H_2SO_4$) to form $RH_2PO_4$ salt, phosphoric acid and a $CaSO_4$ precipitate by reaction at a temperature of about 50°–90° C. for ½ to 8 hours. On removal of the $CaSO_4$ precipitate by filtration, a sufficient amount of the resulting solution of $RH_2PO_4$) in phosphoric acid (at a ratio of about 35 moles $H_3PO_4$ and one mole $RH_2PO_4$) is recycled to the main reactor to effect the acidulation of 6 moles of rock. If desired, a portion of this stream may be treated for the recovery of uranium values from the $H_3PO_4$ as described hereinafter.

The second portion of the solution of calcium phosphate in $H_3PO_4$ may be removed from the system for further processing and the recovery of useful products therefrom. In one embodiment of the invention, the solution is removed to a crystallizer, cooled and maintained at a temperature of about 25° to about 60° C., preferably under vacuum, for a time sufficient to induce crystallization and precipitation of the monocalcium phosphate. Under these conditions about 20–80 weight percent, preferably about 30–60 weight percent of the monocalcium phosphate can be precipitated. After crystallization, the solid monocalcium phosphate can be separated from the remaining solution of monocalcium phosphate in phosphoric acid as by filtration, centrifugation, or other separation means such as a thickener/-separator. The solid calcium monophosphate may then be removed for further reaction or processing as described hereinafter. The resulting solution of monocalcium phosphate in phosphoric acid can also be used.

At this point, it should be noted that the monocalcium phosphate solid recovered is a high purity product since it is not contaminated with the fluorides and materials contained in the waste insolubles since both of these impurities have been previously removed. Accordingly, the purity of the calcium phosphates recovered represents a further advantageous feature of the invention.

After the monocalcium phosphate solid is obtained, it may be reacted with various other reactants to provide additional products. In one aspect, the monocalcium phosphate may be converted to dicalcium phosphate. The solid monocalcium phosphate can be converted to dicalcium phosphate and phosphoric acid by heating a slurry of the monocalcium phosphate at a temperature of about 50° to 100° C. for 1–6 hours and filtering at 25° to 100° C. In a further embodiment the dicalcium phosphate may be formed from monocalcium phosphate by reaction with a calcium salt as described in U.S. Pat. Nos. 1,137,806 and 2,906,602. In a further aspect the solid monocalcium and/or dicalcium phosphate products may be treated by known methods to produce elemental phosphorus as by the blast furnace method (as disclosed for example in U.S. Pat. No. 2,897,057); by use of a fluidized bed (as disclosed for example in U.S. Pat. No. 2,974,016); or by use of an electric furnace (as disclosed for example in U.S. Pat. No. 3,010,796), and the like. In a main embodiment of the invention, however, the monocalcium phosphate or dicalcium phosphate produced therefrom, or a mixture or solution of the calcium phosphate in phosphoric acid is reacted with, (1) a mixture of an alkali metal salt of the formula $R_2SO_4$ or $RHSO_4$, (where R is alkali metal K or Na), or mixtures thereof; (2) mixtures of $RHSO_4$ and sulfuric acid, or (3) sulfuric acid alone. As a result of the reaction with the sulfate salts, the resulting products are alkali metal dihydrogen phosphates and phosphoric acid of high purity. Reaction with sulfuric acid results in the production of a high grade of phosphoric acid. In particular, monocalcium phosphate will react with $R_2SO_4$ salt and dicalcium phosphate will react with $KHSO_4$ salt, yielding primarily $RH_2PO_4$ salts and gypsum; whereas monocalcium phosphate with $R_2SO_4$/$RHSO_4$ mixtures yields $RH_2PO_4$ salts and phosphoric acid. In the reaction with sulfuric acid, high purity phosphoric acid is the resulting product. Also one portion of the calcium phosphate product can be reacted with the $R_2SO_4$ salt and a second portion with sulfuric acid which provides a useful variation on the process.

The alkali metal sulfate or bisulfate reactant, preferably in the form of an aqueous solution, includes both sulfates and hydrogen sulfates as well as mixtures thereof. Thus, the sulfate reactant may be $KHSO_4$, $K_2SO_4$, $NaHSO_4$, $Na_2SO_4$ or mixtures thereof. Potassium hydrogen sulfate ($KHSO_4$) and potassium sulfate ($K_2SO_4$) are preferred reactants.

In this embodiment, the solid monocalcium phosphate or dicalcium phosphate is reacted with $RHSO_4$ or $R_2SO_4$ and/or sulfuric acid in water and/or phosphoric acid solution in stoichiometric relationships at temperatures of about 50°–130° C. for 2 to 8 hours to optimize $CaSO_4$ crystal growth. The resulting slurry is then filtered and the $CaSO_4$ removed to leave a solution of $RH_2PO_4$ salt or mixtures thereof with phosphoric acid. These final product components may be separated and recovered as desired as various alternative procedures are available to effect precipitation of the $RH_2PO_4$ salt from the phosphoric acid solution. In one procedure the solution may be concentrated or evaporated by known methods, e.g., by vacuum cooling, which can provide crystallization of the $RH_2PO_4$ product which is then removed by filtration and subsequently dried.

In a separate embodiment, the $RH_2PO_4$/$H_3PO_4$ solution may be resolved by solvent precipitation as described in U.S. Pat. No. 3,697,246. The preferred solvent for this procedure comprises a lower alkyl alcohol or lower alkyl ketone. Methanol and acetone are highly preferred. The solvent is usually added to the solution in about equal volume or an excess of the solvent may be used. Addition of the solvent to the solution should be at a temperature of about 25°–50° C. and under these conditions, there will result the precipitation of the solid $RH_2PO_4$ product from the solution of the phosphoric acid and the solvent reused.

In an alternative recovery procedure, the $RH_2PO_4$/phosphoric acid solution may be treated by solvent extraction techniques for recovery of products. In these procedures a solution of the alkali metal dihydrogen phosphate and phosphoric acid is extracted with generally water-immiscible solvents such as dialkyl ethers and dialkyl formals having alkyl groups of about 1 to 7 carbon atoms, or $C_5$ to $C_{10}$ alkyl alcohols, which complex the free $H_3PO_4$ into the organic phase. The remaining aqueous alkali metal dihydrogen phosphate solution is then concentrated and solid $RH_2PO_4$ crystallized therefrom. The phosphoric acid is recovered from the organic phase by the addition of water and heat whereby the organic phase becomes suitable for recycle.

In an alternative embodiment the solid monocalcium phosphate can be reacted with sulfuric acid at a temperature of about 50° to 80° C. to provide a high grade of phosphoric acid. In this reaction, calcium sulfate will be precipitated and removal of the calcium sulfate will provide a high purity phosphoric acid. A portion of the phosphoric acid is drawn off for use as feed grade acid. The remaining high purity acid may be recycled back to the acidulation reaction.

In a further alternative embodiment, monocalcium phosphate may be reacted with $K_2SO_4$ and dicalcium phosphate may be reacted with the $RHSO_4$ salt, under the reaction conditions indicated to provide $RH_2PO_4$ salt in aqueous solution. From this solution, the solid $RH_2PO_4$ can be recovered by concentration as described previously. However, in this specific instance, evaporating the water is sufficient to provide the solid product.

The phosphoric acid solutions recovered as final products in any stage of this process, having been subject to recycle and regeneration steps in operation of a continuous procedure, have now been enriched to provide higher uranium concentrations and as such, the uranium is more readily extracted by the use of known methods, e.g., as described in U.S. Pat. No. 2,835,552. Thus the uranium can be recovered by continuous recycle of the phosphate solution until the optimum level of uranium has built up in the phosphate solution. Thereafter, the uranium can be recovered from the acid by known liquid-liquid extraction procedures using organic solvents, e.g., phosphoric acid esters of alkyl monohydric alcohols.

Referring now to the FIG. 1 drawing accompanying this application, it will be seen that there is shown a specific embodiment of the process of the invention. In this embodiment $R_2O$ values for the acidulations are provided by $KH_2PO_4$ and a continuous system is shown. As shown in the drawing, phosphate rock from line 2 is introduced into reactor 1 where it is reacted with a recycle stream introduced from line 3 to effect solubilization of the phosphate rock and form a solution of calcium phosphate in phosphoric acid and precipitation of the insolubles and fluorides. For each mole of phosphate rock introduced, the makeup stream contains a ratio of about 35 moles $H_3PO_4$ and 1 mole $KH_2PO_4$. The reaction conditions comprise a residence time of about 2 hours and a temperature of 80° C. The reactor 1 may be a single reactor or a multi-stage countercurrent reactor but is preferably the latter provided with means for internal slurry recycle. The slurry resulting from the solution in reactor 1 is passed by line 4 to a filter separator 5 where filterable precipitates are removed in line 6 from the solution of monocalcium phosphate in phosphoric acid. The precipitate which contains $K_2SiF_6$ and sand is removed by line 6 for recovery of the solid fluorides by further processing.

In the meantime, the resulting clear solution from separator 5 is passed by line 7 to vessel 8 where the solution is divided. However, in an alternative embodiment, the solution can be further treated to remove flocculent impurities. Thus, the solution will be passed by line 9 to thickener 10 where the impurities are thickened sufficiently by known means to be separated and removed for discard by line 11. Thereafter, the clear solution is returned to line 7 by line 12. In tank 8, a portion of the solution, preferably an amount containing 3 moles of $P_2O_5$, is withdrawn from the system by line 13 for further processing in reactor 14 as desired as by the recovery of monocalcium phosphate and phosphoric acid and/or conversion to $KH_2PO_4$ and/or $H_3PO_4$. These reactions are fully described hereinabove.

In the meantime, the remainder of the solution from tank 8 is passed via line 15 to reactor 16 for reaction with a solution comprising a stoichiometric amount of $KHSO_4$ and sulfuric acid introduced from line 17. This solution preferably contains an 11:1 molar ratio of $H_2SO_4:KHSO_4$, the ratio needed to react with the solution of monocalcium phosphate in phosphoric acid to provide the proper 35:1 molar $H_3PO_4/KH_2PO_4$ ratio used in the rock attack phase.

In reactor 16, these materials are reacted at a temperature of 70° C. for 2 hours to precipitate the calcium and sulfates present as $CaSO_4$ and the slurry is removed by line 18 to filter 19. From filter 19, the $CaSO_4$ solid is removed by line 20 and the solution is removed by line 21 for introduction into main reactor 1 by line 3. This solution will normally contain the anticipated amounts of $KH_2PO_4$ and $H_3PO_4$. However, fresh makeup of either material can be introduced to maintain a steady state system.

In alternative embodiments, the phosphoric acid recovered at any convenient point within this scheme may be extracted to recover uranium values as described hereinabove. After the uranium is recovered the resulting phosphoric acid may be used as desired or recycled to the main reactor.

The alkali metal dihydrogen phosphate recovered from this reaction as a solid product can be marketed as is or further processed with or without $P_2O_5/K_2O$ adjustment by heating (dehydrating) to a temperature of 150° to 450° C. to form alkali metal polyphosphate products.

It will thus be seen that the main steps of the process of this invention, together with the various alternative procedures made available by the uniqueness and high purity of the monocalcium phosphate and phosphoric acid recovered from the initial step, provide truly advantageous procedures for the acidulation of phosphate rock with the recovery of the valuable products contained therein in the substantial absence of fluorine pollution and contamination by other components or other impurities. Thus, the process provides optional procedures whereby the various advantages are achieved which provide for recovery of valuable products such as alkali metal dihydrogen phosphates, pure phosphoric acid, radioactive values contained in the phosphoric acid, and the fluorides as useful solid products from their admixture in the phosphate rock. Thus, the process is considered to represent a substantial advance in the art.

Figure 2:
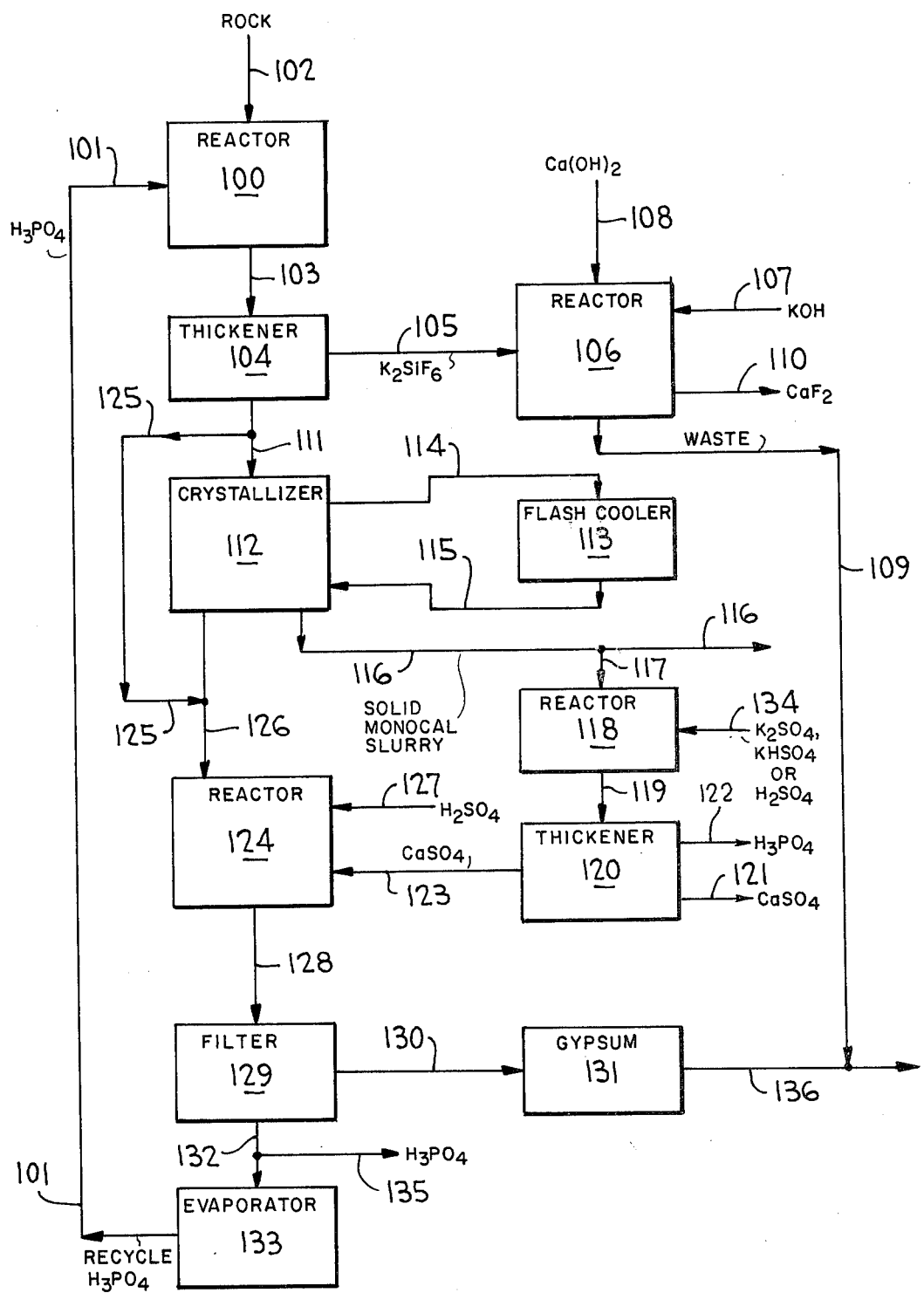
FIG. 2 shows a preferred embodiment including alternative variations on the process for conducting a specific process of this invention.

FIG. 2 represents a specific and preferred embodiment of a continuous reaction of the invention. In this embodiment, a main reactor 100 is maintained at 85°–95° C., which reactor may be a series of reactors with internal recycle of the reacting mixture. There is fed into the reactor a phosphoric acid recycle stream by line 101 containing a low percentage of $K_2O$ present in this system by the addition of $KH_2PO_4$ as produced in a later step. Phosphate rock is fed into reactor 100 by line 102. The addition of rock and acid are controlled so as to provide about 420 moles of $H_3PO_4$ containing 12 moles of $KH_2PO_4$ (35:1 ratio of $H_3PO_4/KH_2PO_4$) for each 6 moles of phosphate rock. On completion of the reaction, the contents are passed to a separator to remove insoluble materials.

In one embodiment for conducting this reaction, use may be made of a countercurrent extraction reactor as advantages are achieved thereby. In this aspect, a column is employed with the rock being introduced at the top of the column and phosphoric acid introduced into the bottom of the column at such a rate as to maintain the reacting rock in suspension. As the reaction proceeds, phosphoric acid solution containing the slimes may be removed at the top of the column and the higher density silica solids removed at the bottom.

In a further aspect, the mixture could be passed at the reaction temperature to a hot separator for separation of insoluble slime materials. The slimes contain micronutrients and may be preferably combined with gypsum recovered from a later step to provide a low analysis fertilizer. The resulting clear and hot solution from the separator may then be subjected to vacuum crystallization at a temperature of about 40°–50° less than the reaction temperature, e.g. about 50° C. Rapid cooling is preferred as by use of a flash cooler. In this step, $K_2SiF_6$ precipitates in relatively pure form and can be separated, recovered and treated as described herein.

However, in the preferred embodiment of FIG. 2, the contents of reactor 100 are passed by line 103 to thickener-decanter 104. Using the thickener-decanter, an underflow is removed by line 105 which contains the insoluble fluorides as $K_2SiF_6$, which product is then passed to reactor 106 for processing and/or recovery. In this latter reactor 106, the preferred procedure is to add by line 107 four moles of KOH as a 50% aqueous solution to the reactor for each mole of $K_2SiF_6$ calculated to be present to form KF in water solution and precipitate the $SiO_2$. The sand and slimes are removed by line 109 and treated as described hereinafter. Calcium hydroxide is then added by line 108 in sufficient amounts to react with the KF solution and form fluospar ($CaF_2$) which precipitates. The $CaF_2$ is recovered by line 110 for use as desired as it is substantially pure.

In the meantime, the overflow from the thickener-decanter, still at an elevated temperature, is a solution of monocalcium phosphate in phosphoric acid, and this solution is passed by line 111 to a crystallizer evaporator 112 where precipitation is effected by cooling the solution to about 50° C. In this system a flash cooler 113 may be utilized to effect cooling as by continuous withdrawal of a portion of the mixture by line 114, passing through the flash cooler 113 and then passing the cooled mixture to the crystallizer by line 115. By this method a constant 50° C. or other temperature can be maintained in the crystallizer in the continuous operation. Alternatively, an evaporator can be used to remove water and precipitate the solid monocalcium phosphate by evaporation to a $P_2O_5$ concentration of about 30–40%.

In the main embodiment, from the crystallizer 112, there is recovered in line 116 a solid monocalcium phosphate slurry as an underflow which can then be treated in various ways. In one procedure the slurry is centrifuged to recover high purity monocalcium phosphate solid. Alternatively, the slurry from line 116 can be passed by line 117 to reactor 118 for reaction at 50°–90° C. with a stoichiometric amount of $K_2SO_4$, $KHSO_4$ or sulfuric acid, from line 134 to form $KH_2PO_4$ and $CaSO_4$ with $K_2SO_4$, phosphoric acid and $CaSO_4$ with sulfuric acid. Obviously, $KHSO_4$, a mixture of $K_2SO_4$ and $H_2SO_4$ will provide $KH_2PO_4/H_3PO_4$ mixtures. The reacting mixture from reactor 118 would then be passed to a thickener or other separator 120 by line 119 where the $CaSO_4$ is separated by line 121 from the $KH_2PO_4/H_3PO_4$ solution or $H_3PO_4$ which can be removed by line 122. If necessary, the $KH_2PO_4$ can be separated from the $H_3PO_4$ to permit recovery of both products as described above. Alternatively, when using a thickener, the $CaSO_4$, which may contain some $KH_2PO_4$, can be passed as an underflow by line 123 to the gypsum synthesis in reactor 124 as described hereinafter.

The monocalcium phosphate-$H_3PO_4$ solution from the crystallizer 112 or the solution from the by-pass 125 which bypasses crystallizer 112, can be passed by line 126 to gypsum synthesis and phosphoric acid regeneration in reactor 124 by reaction with sulfuric acid from line 127 in stoichiometric amounts, which reaction will be effective to form phosphoric acid and gypsum ($CaSO_4\cdot 2H_2O$). Although gypsum per se represents a preferred embodiment of $CaSO_4$ recovery, use of higher temperatures and higher $P_2O_5$ concentrations or both, lend themselves to the recovery of a stable hemihydrate ($CaSO_4\cdot 1/2H_2O$), which may prove advantageous where this form is desired. The $CaSO_4$ or gypsum from thickener/separator 120, which may contain some $KH_2PO_4$, may be introduced into this reaction by line 123 to recombine the $CaSO_4$ products. The resulting slurry is passed by line 128 to a filter 129 and washed and substantially clean gypsum recovered at 131 from the filter by line 130. The gypsum recovered may subsequently be used for the production of products, such as wallboard, from line 136, or it may be combined with the sand and micronutrient slimes from line 109 to produce low analysis fertilizer products (0-20-0) suitable for direct application or blending.

The $H_3PO_4$ solution from filter 129 is removed by line 132 and if desired, product $H_3PO_4$ can be removed by line 135. The remaining phosphoric acid containing a low concentration of $K_2O$ is passed by line 132 to surge and skimmer 133 for adjustment of the $H_3PO_4$ and $K_2O$ concentration as by evaporation. The resulting low $K_2O$ phosphoric acid recycle stream is then passed by line 101 for further reaction with the phosphate rock in the main reactor.

As will be understood, the process of FIG. 2 demonstrates a continuous process for conducting the process of the invention including the recovery of various alternative products and thus demonstrates the versatility of the process, all of which is dependent on initially obtaining a fluoride-free solution of calcium phosphate in phosphoric acid.

The following examples are presented to illustrate the invention but it is not to be considered as limited thereto. In these examples and throughout the specification, parts are by weight unless otherwise indicated.

EXAMPLE I

In this example phosphate rock was reacted with phosphoric acid containing $KH_2PO_4$ at a temperature of 60° C. with a residence time of three hours. In this reaction, the phosphate rock was reacted with a recycle solution of phosphoric acid and $KH_2PO_4$ which contained the concentration described hereinafter.

The reactants and products gave the following analysis by weight:

| Input by Weight | CaO | $K_2O$ | $P_2O_5$ | Fe | Al | Mg | F | Total |
|---|---|---|---|---|---|---|---|---|
| Phosphate Rock | 60.0 | .44 | 47.0 | .4 | .9 | .2 | 4.4 | 128 |
| Phosphoric Acid | | 8.1 | 424.0 | — | — | — | 0.6 | 1300 |
| $K_2SiF_6$ (Recycle) | | 1.3 | | | | | 1.9 | 3 |
| Total Input | | | | | | | | 1431 |
| Output by Weight | | | | | | | | |
| Dry Slimes | .7 | 3.2 | 0.2 | .1 | .6 | — | 3.4 | 37.5 |
| Filtrate | 43.0 | 9.1 | 490.0 | .4 | .4 | .1 | 2.4 | 1410.0 |
| Total Output | | | | | | | | 1447.5 |

During the reaction, the evolution of fluorine was not detected. On completion of the reaction, the precipitated and undissolved solids were filtered and dried to provide a solid product and a filtrate. Material balance and analysis of these products are given above.

The filtrate obtained after removal of the crystalline monocalcium phosphate as illustrated in Example II still contains appreciable dissolved CaO. This filtrate is then treated with sufficient 1/11 molar ratio $KHSO_4$ dissolved in 90% $H_2SO_4$ to precipitate the calcium ion completely at 70° C. The resulting phosphoric acid solution is readily decanted from the $CaSO_4$ formed and the resulting slurry filtered by conventional means. The filtrate produced in this manner then provides the phosphoric acid makeup to acidulate additional phosphate rock in the recycle system.

EXAMPLE II

The 1410 gram sample of the filtrate solution being removed from the system in Example I after initial filtration, was cooled at 25° C. for five hours to precipitate solid monocalcium phosphate. On filtration, a total 40.5 grams of solid monocalcium phosphate was recovered.

This 40.5 grams of the solid monocalcium phosphate and 50 grams of water were placed in a reaction vessel equipped with a reflux condenser and stirrer. After temperature was brought up to 70° C. the following were added over a 3 hour period at 70° C. while stirring: a solution of 150 grams of water, 10.1 grams of 85% $H_3PO_4$; and 11.4 grams of $KH_2PO_4$; and 23.9 grams of solid $KHSO_4$. At the end of this 3 hour period the reaction was continued for another 2 hours. Then the slurry was filtered at 70° C. and the solid $CaSO_4$ washed with water.

The resulting filtrate was found on analysis to be a solution of $KH_2PO_4$ in $H_3PO_4$ and to provide a $K_2O$ to $P_2O_5$ ratio of 9 to 26. Calcium oxide content was 0.68 parts and sulfate content was 1.6 parts.

EXAMPLE III

In this example, the solid from the initial filtration, comprising primarily $K_2SiF_6$ which may contain impurities was reacted with about a stoichiometric amount of KOH by addition of the KOH as a 5% aqueous solution to a stirred mixture of the $K_2SiF_6$ at 85°–100° C. for 2 hours. On cooling the precipitated $SiO_2$ was filtered off and washed with water. The resulting solution of KF in water was reacted with a 5%–10% molar excess of calcium hydroxide contained in a 25% aqueous suspension by heating at 75° C. for 1 hour. On cooling, solid $CaF_2$ precipitated out and was filtered off and washed.

EXAMPLE IV

In this example, phosphate rock was continuously reacted with a recycle solution of phosphoric acid containing $KH_2PO_4$ in a ratio of 420 moles of phosphoric acid containing 12 moles of $KH_2PO_4$ for each 6 moles of phosphate rock. The acidulation reaction was conducted at a temperature of 90° C., preferably with a countercurrent extraction type reactor in order to obtain complete reaction. At the conclusion of the reaction, the resulting solution which contained some insolubles was then filtered in a continuous filter at 90° C. to provide a filter cake comprising slimes and containing essentially sand and other insolubles. The filtrate from this hot filtration was a clear solution and was then passed to a vacuum crystallizer and cooled rapidly to 50° C. with a flash cooler. During the cooling procedure, crystals separated from solution and the resulting slurry at 50° C. was then filtered at that temperature. The resulting crystals were analyzed to be relatively pure potassium fluosilicate. The clear solution filtrate was then passed to an evaporator connected to a vacuum condenser and water evaporated therefrom to obtain a solution analyzed to contain 35% $P_2O_5$ at which point solid crystallized from solution. On settling after evaporation the liquid was decanted from the solid. The liquid was found to comprise phosphoric acid containing the remaining soluble monocalcium phosphate. The filter cake obtained from the decantation was found to be relatively pure monocalcium phosphate.

The monocalcium phosphate solid was then reacted with a stoichiometric amount of potassium sulfate in aqueous solution to form $KH_2PO_4$ and calcium sulfate. The calcium sulfate precipitate is separated by filtration and recovered. The solution or filtrate from this filtration is subjected to evaporation for the precipitation of potassium dihydrogen phosphate which is then recovered by filtration.

The liquid from the evaporator is reacted with a stoichiometric amount of sulfuric acid at 60° C. to form phosphoric acid and gypsum. The gypsum is removed by filtration for recovery. The phosphoric acid concentration may require adjustment and a sufficient amount is then removed to provide a phosphoric acid solution containing $KH_2PO_4$ in the proper ratio for recycle to the acidulation reactor.

The invention has been described herein with reference to certain preferred embodiments. However, as obvious variations thereon will become apparent to those skilled in the art, the invention is not to be considered as limited thereto.

What is claimed is:

1. A method for the treatment of phosphate rock to recover phosphoric acid essentially free of fluoride contamination and recover the fluorine values contained in said phosphate rock in useful form, said reaction being conducted in the substantial absence of fluoride gas evolution, the process comprising the steps of:
    (a) reacting a fluoride-containing phosphate rock with a solution of phosphoric acid containing values of potassium ions as $K_2O$ values, the $K_2O$ values being provided by the presence of $KH_2PO_4$, in an acidulation reactor using a sufficient amount of phosphoric acid to acidulate said phosphate rock and form monocalcium phosphate at a temperature of about 90° to 100° C.; the amount of phosphoric acid used being sufficient to provide a molar ratio of $P_2O_5$ in the phosphoric acid to $P_2O_5$ in the rock in the range of about 6:1 to 15:1 respectively; and said phosphoric acid containing a sufficient amount of said $KH_2PO_4$ to react with fluorides liberated during said acidulation and convert said fluorides to solid potassium fluosilicates;

(b) solubilizing the monocalcium phosphate resulting from the reaction into the phosphoric acid solution;

(c) separating the insolubles contained in the hot solution of monocalcium phosphate in phosphoric acid at about the reaction temperature;

(d) cooling the resulting solution by a temperature difference of about 40° to 50° C. below said reaction temperature to precipitate a relatively pure potassium fluosilicate;

(e) separating and recovering the solid potassium fluosilicate precipitate; and (f) recovering a solution of monocalcium phosphate in phosphoric acid substantially free from fluoride impurities.

2. A method according to claim 1 wherein the monocalcium phosphate in phosphoric acid solution recovered from the system is cooled to a temperature of 25° to 50° C. to crystallize solid monocalcium phosphate, and the solid monocalcium phosphate is separated from the phosphoric acid and recovered.

3. A method according to claim 2 wherein the solid monocalcium phosphate recovered is reacted with a member selected from the group consisting of (a) $K_2SO_4$, (b) $KHSO_4$ to form (a') $KH_2PO_4$ and (b') $KH_2PO_4$ + $H_3PO_4$, respectively, with precipitation of calcium sulfate, and (c) $H_2SO_4$, to form phosphoric acid with precipitation of calcium sulfate.

4. A method according to claim 3 wherein the monocalcium phosphate is reacted with sulfuric acid to form phosphoric acid and a calcium sulfate precipitate, the precipitate is removed and the phosphoric acid is recovered.

5. A method according to claim 2 wherein dicalcium phosphate is formed from the monocalcium phosphate and reacted with $KHSO_4$ to form $KH_2PO_4$ and water, and the $KH_2PO_4$ is recovered.

6. A method according to claim 2 wherein the solid monocalcium phosphate is reacted with coke and sand in a phosphate furnace to produce elemental phosphorus.

7. A method according to claim 1 wherein a portion of the solution of monocalcium phosphate in phosphoric acid is removed from the system and the remainder is treated with a member selected from the group consisting of (1) $K_2SO_4$, and (2) $H_2SO_4$, to precipitate calcium sulfate, removing the calcium sulfate and recycling the resulting phosphoric acid solution to the acidulation reactor to provide $H_3PO_4$ and potassium ions as a salt of the formula $KH_2PO_4$.

8. A method according to claim 5 wherein a ratio of about 35 moles of phosphoric acid and one mole of $KH_2PO_4$ are present in the acidulation reactor for each mole of phosphate rock.

9. A method according to claim 5 wherein the remainder of the solution of monocalcium phosphate in phosphoric acid is reacted with a member selected from the group consisting of (1) 5 moles of $KHSO_4$ and 55 moles $H_2SO_4$, and (2) 2.5 moles of $K_2SO_4$ and 57.5 moles $H_2SO_4$, for each 60 moles monocalcium phosphate and 340 moles $H_3PO_4$, by reaction at a temperature of about 50° to 90° C., the precipitated calcium sulfate is separated and a resulting solution containing about 420 moles $H_3PO_4$ and 12 moles $KH_2PO_4$ is recycled to the acidulation reactor to react with each 6 moles of phosphate rock.

10. A method according to claim 1 wherein the precipitate containing the potassium fluosilicate is removed by filtration, reacted with KOH to form a solution of KF with removal of precipitated $SiO_2$, and the KF is reacted with calcium hydroxide to form $CaF_2$ and KOH.

11. A method according to claim 8 wherein the phosphoric acid solution recovered after separation of the solid potassium fluosilicate, is thickened to precipitate any colloidal impurities present, filtered to remove the impurities, and a clear solution of monocalcium phosphate in phosphoric acid is removed.

12. A method according to claim 1 wherein the monocalcium phosphate solution recovered from the system is reacted with a member selected from the group consisting of (1) aqueous solution of $K_2SO_4$, (2) an aqueous solution of $KHSO_4$ and (3) $H_2SO_4$.

* * * * *